US009961669B2

(12) United States Patent
Chapelot et al.

(10) Patent No.: US 9,961,669 B2
(45) Date of Patent: May 1, 2018

(54) NEAR FIELD COMMUNICATION (NFC) TO BLUETOOTH HANDOVER

(71) Applicant: QUALCOMM Incorporated, San Diego, CA (US)

(72) Inventors: Pascal Chapelot, Cambridge (GB); Samson Pynadath, Cambridge (GB); Jatinderjit Singh, Cambridge (GB); Donato Angelini, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/237,511

(22) Filed: Aug. 15, 2016

(65) Prior Publication Data

US 2017/0318557 A1    Nov. 2, 2017

Related U.S. Application Data

(60) Provisional application No. 62/328,409, filed on Apr. 27, 2016.

(51) Int. Cl.
H04B 5/00        (2006.01)
H04W 68/02       (2009.01)
H04W 4/00        (2018.01)
H04W 8/22        (2009.01)
H04W 48/16       (2009.01)
H04W 36/00       (2009.01)
H04W 36/36       (2009.01)
H04W 36/08       (2009.01)

(52) U.S. Cl.
CPC .......... H04W 68/02 (2013.01); H04B 5/0031 (2013.01); H04W 4/008 (2013.01); H04W 8/22 (2013.01); H04W 36/0005 (2013.01); H04W 36/08 (2013.01); H04W 36/36 (2013.01); H04W 48/16 (2013.01)

(58) Field of Classification Search
None
See application file for complete search history.

(56) References Cited

U.S. PATENT DOCUMENTS 7,565,108 B2    7/2009  Kotola et al.
8,224,246 B2 *  7/2012  Suumaki ............ G06K 7/10237
                                                455/41.1

(Continued)

FOREIGN PATENT DOCUMENTS

CN         105392114 A     3/2016

OTHER PUBLICATIONS

Bluetooth, "Specification of the Bluetooth System", Covered Core Package version: 4.0, Jun. 30, 2010, vol. (0-6), pp. 1-2302.

(Continued)

Primary Examiner — Tuan A Tran
(74) Attorney, Agent, or Firm — Muncy, Geissler, Olds & Lowe, P.C./QUALCOMM

(57) ABSTRACT

In one aspect, a method of wireless communication by a first wireless device includes detecting a near field communication (NFC) read of the first wireless device. The NFC read may be a read initiated by a second wireless device via an NFC interaction between the first wireless device and the second wireless device. The method also includes adjusting at least one Bluetooth paging scan parameter of the first wireless device in response to detecting the NFC read.

34 Claims, 6 Drawing Sheets

(56) References Cited

U.S. PATENT DOCUMENTS

| | | | | |
|---|---|---|---|---|
| 8,818,276 B2* | 8/2014 | Kiukkonen | ............ | H04L 63/107 |
| | | | | 455/41.1 |
| 8,995,908 B2* | 3/2015 | Pedro | .................... | H04W 4/008 |
| | | | | 375/256 |
| 9,002,266 B2* | 4/2015 | Song | ........................ | H04B 7/26 |
| | | | | 455/41.1 |
| 9,425,861 B2* | 8/2016 | Song | .................... | H04W 76/023 |
| 2007/0001853 A1 | 1/2007 | Otranen | | |
| 2011/0275316 A1* | 11/2011 | Suumaki | ............ | G06K 7/10237 |
| | | | | 455/41.1 |
| 2012/0238205 A1* | 9/2012 | Reunamaki | .............. | H04B 5/02 |
| | | | | 455/41.1 |

OTHER PUBLICATIONS

Dhanabal S., "NFC Connection Handover Protocol: An Application Prototype," University of Tampere, School of Information Sciences, Computer Science, Feb. 2015, 59 pages.
NFC World Congress: "Bluetooth Secure Simple Pairing Using NFC Part 2," Sep. 24, 2014, Marseille, France, Slide 1 to Slide 48.
International Search Report and Written Opinion—PCT/US2017/022465—ISA/EPO—dated Jun. 19, 2017.
NFC Forum: "Bluetooth Secure Simple Pairing Using NFC Application Document NFC Forum", Jan. 9, 2014 (Jan. 9, 2014), XP055374018, pp. 1-39, Retrieved from the Internet: URL:http://members.nfcforum.org/apps/group_public/download.php/18688/NFCForumAD-BTSSP_1_1.pdf.

* cited by examiner

NEAR FIELD COMMUNICATION (NFC) TO BLUETOOTH HANDOVER

CROSS-REFERENCE TO RELATED APPLICATION

The present Application for Patent claims the benefit of U.S. Provisional Application No. 62/328,409, entitled "NEAR FIELD COMMUNICATION (NFC) TO BLUETOOTH HANDOVER" filed Apr. 27, 2016, assigned to the assignee hereof and expressly incorporated herein by reference in its entirety.

FIELD OF DISCLOSURE

Disclosed aspects relate to wireless communications. More specifically, exemplary aspects are directed to improvements in establishing a Bluetooth connection in a wireless communication system.

BACKGROUND

Wireless communication systems, including data communication systems, have been under continual development for many years. Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, Bluetooth, near field communication (NFC), etc.

Generally, NFC is perceived as a "touch to do" technology that allows wireless devices to communicate just by bringing them close together. However, in some applications (e.g., tap-to-play (music), tap-to-pair etc.), it may be desirable to switch communications from NFC to another wireless communication, such as Bluetooth. The user experience for a Bluetooth handover from NFC depends on the time it takes to complete the handover. This time may vary significantly between few milliseconds to a few seconds.

There are mainly two user-perceived events that dictate the user experience: (1) an 'NFC-Tap'—the physical tapping of the NFC device with the intention of initiating a handover; and (2) The user sensing the completion of the desired action. The user experience is determined by the time delay between the NFC tap and start of the music being played out of the speaker. That is, the shorter the time delay, the better the user experience.

The time taken for the NFC to Bluetooth handover may include the following: (a) a time for the NFC transactions to exchange the Bluetooth credentials that are required to establish the Bluetooth connection for the music streaming; and (b) a time taken for the Bluetooth connection and start streaming the music.

The Bluetooth connection time is much higher than for the NFC transaction and if reduced will improve the user experience.

SUMMARY

Aspects of the present disclosure include a method, a wireless device, and a computer-readable medium for wireless communications. For example, according to one aspect, a method of wireless communication by a first wireless device includes detecting a near field communication (NFC) read of the first wireless device. The NFC read may be a read initiated by a second wireless device via an NFC interaction between the first wireless device and the second wireless device. The method also includes adjusting at least one Bluetooth paging scan parameter of the first wireless device in response to detecting the NFC read.

According to another aspect, a wireless device includes a near field communication (NFC) transceiver, a Bluetooth transceiver, memory, and a processor. The processor is coupled to the memory to access and execute instructions included in program code to direct the wireless device to detect a near field communication (NFC) read of the wireless device by another wireless device via an NFC interaction between the wireless device and the other wireless device. The program code also includes instructions to adjust at least one Bluetooth paging scan parameter of the wireless device in response to detecting the NFC read.

In yet another aspect, a non-transitory computer-readable medium including program code stored thereon for performing wireless communications by a wireless device. The program code includes instructions to direct the wireless device to detect a near field communication (NFC) read of the wireless device by another wireless device via an NFC interaction between the wireless device and the other wireless device. The program code also includes instructions to adjust at least one Bluetooth paging scan parameter of the wireless device in response to detecting the NFC read.

In still another aspect, a wireless device includes a near field communication (NFC) transceiver, a Bluetooth transceiver, and means for detecting, by the wireless device, a near field communication (NFC) read of the wireless device by another wireless device via an NFC interaction between the wireless device and the other wireless device. The wireless device also includes means for adjusting at least one Bluetooth paging scan parameter of the wireless device in response to detecting the NFC read.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Various aspects are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of non-transitory computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter.

Figure 1:
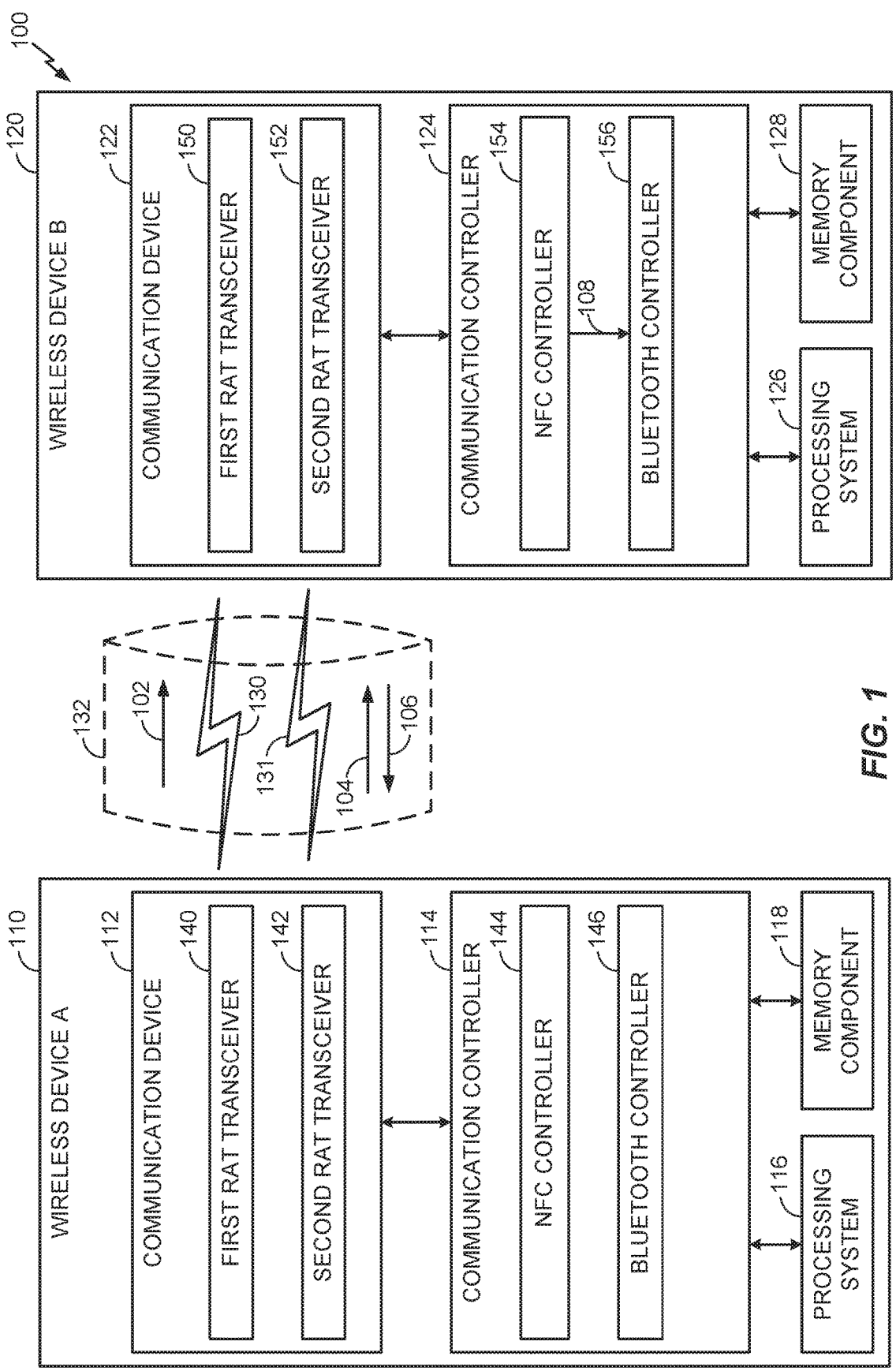
FIG. 1 illustrates an example wireless communication system, according to aspects of the disclosure.

FIG. 1 illustrates an example wireless communication system 100, according to aspects of the disclosure. In the example wireless communication system 100 a wireless device A 110 wirelessly communicates with another wireless device B 120. Unless otherwise noted, the term "wireless device" is not intended to be specific or limited to any particular Radio Access Technology (RAT). In general, a wireless device may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, a wireless device may operate according to one or several RATs in communicating with another wireless device depending on the network in which the wireless device is deployed, and may be alternatively referred to as a Base Station (BS), a Network Node, a NodeB, an evolved NodeB (eNB), etc.

In the example of FIG. 1, the wireless device 110 and the wireless device 120 each generally include a wireless communication device (represented by the communication devices 112 and 122) for communicating with other wireless devices via at least one designated RAT. The communication devices 112 and 122 may be variously configured for transmitting and encoding signals (e.g., messages, indications, information, and so on), and, conversely, for receiving and decoding signals (e.g., messages, indications, information, pilots, and so on) in accordance with the designated RAT. The wireless device 110 and the wireless device 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may operate at the direction of or otherwise in conjunction with respective host system functionality (illustrated as the processing systems 116 and 126 and the memory components 118 and 128). In some designs, the communication controllers 114 and 124 may be partly or wholly subsumed by the respective host system functionality.

Turning to the illustrated communication in more detail, the first RAT transceiver 150 of wireless device 120 may transmit and/or receive messages with the first RAT transceiver 140 of the wireless device 110 via a wireless link 130, the message including information related to various types of communication (e.g., data, associated control signaling, etc.). The second RAT transceiver 152 of wireless device 120 may transmit and/or receive messages with the second RAT transceiver 142 of the wireless device 110 via a wireless link 131, the message including information related to various types of communication (e.g., voice, data, multimedia services, associated control signaling, etc.).

The wireless link 130 and wireless link 131 may operate over a communication medium of interest, shown by way of example in FIG. 1 as the medium 132, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the wireless device 110 and the wireless device 120 for the medium 132.

As a particular example, first RAT transceiver 150 and the first RAT transceiver 140 may be near field communication (NFC) transceivers where the medium 132 may correspond to at least a portion of a frequency band corresponding to NFC RAT. Similarly, the second RAT transceiver 152 and the second RAT transceiver 142 may be Bluetooth transceivers where the medium 132 also corresponds to at least a portion of a frequency band corresponding to Bluetooth RAT.

Furthermore, the wireless device 110 and the wireless device 120 may operate via other wireless links (not shown) according to one or more other RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, in particular those employing small cell access points, have extended operation into unlicensed frequency bands such as the Unlicensed National Information Infrastructure (U-NII) band used by Wireless Local Area Network (WLAN) technologies, most notably IEEE 802.11x WLAN technologies generally referred to as "Wi-Fi."

In the example of FIG. 1, the communication device 112 of the wireless device 110 includes the first RAT transceiver 140 configured to operate in accordance with one RAT (e.g., NFC) and a second RAT transceiver 142 configured to operate in accordance with another RAT (e.g., Bluetooth). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The first RAT transceiver 150 and the second RAT transceiver 152 may provide different functionalities and may be used for different purposes. As an example, the first RAT transceiver 150 may operate in accordance with NFC technology to provide communication with the wireless device 110 on the wireless link 130, while the second RAT transceiver 152 may operate in accordance with Bluetooth technology to further communicate with the wireless device 110 on the wireless link 131.

As shown in FIG. 1, wireless device 120 includes an NFC controller 154 for performing and/or receiving NFC interactions with the NFC controller 144 of wireless device 110 via wireless link 130. Wireless device 120 also includes a Bluetooth controller 156 for establishing a Bluetooth connection with the Bluetooth controller 146 of the wireless device 110 via wireless link 131. In some applications communication controller 124 may be configured to establish a Bluetooth connection with wireless device 110 without establishing an NFC connection between wireless device 120 and wireless device 110. In another example, the communications controller 124 may be configured to first establish the NFC connection between the wireless device 120 and the wireless device 110 and then subsequently establish a Bluetooth connection between the wireless device 120 and wireless device 110. In yet another example, the communications controller 124 may be configured to initiate the establishment of a Bluetooth connection between the wireless device 120 and wireless device 110 in response to an NFC interaction (e.g., NFC read) between the wireless device 120 and wireless device 110 before an NFC connection is even established. These procedures of establishing a Bluetooth connection after establishing the NFC connection or in response to an NFC interaction prior to establishment of an NFC connection may be referred to as a NFC to Bluetooth handover of the wireless device 110.

Figure 2:
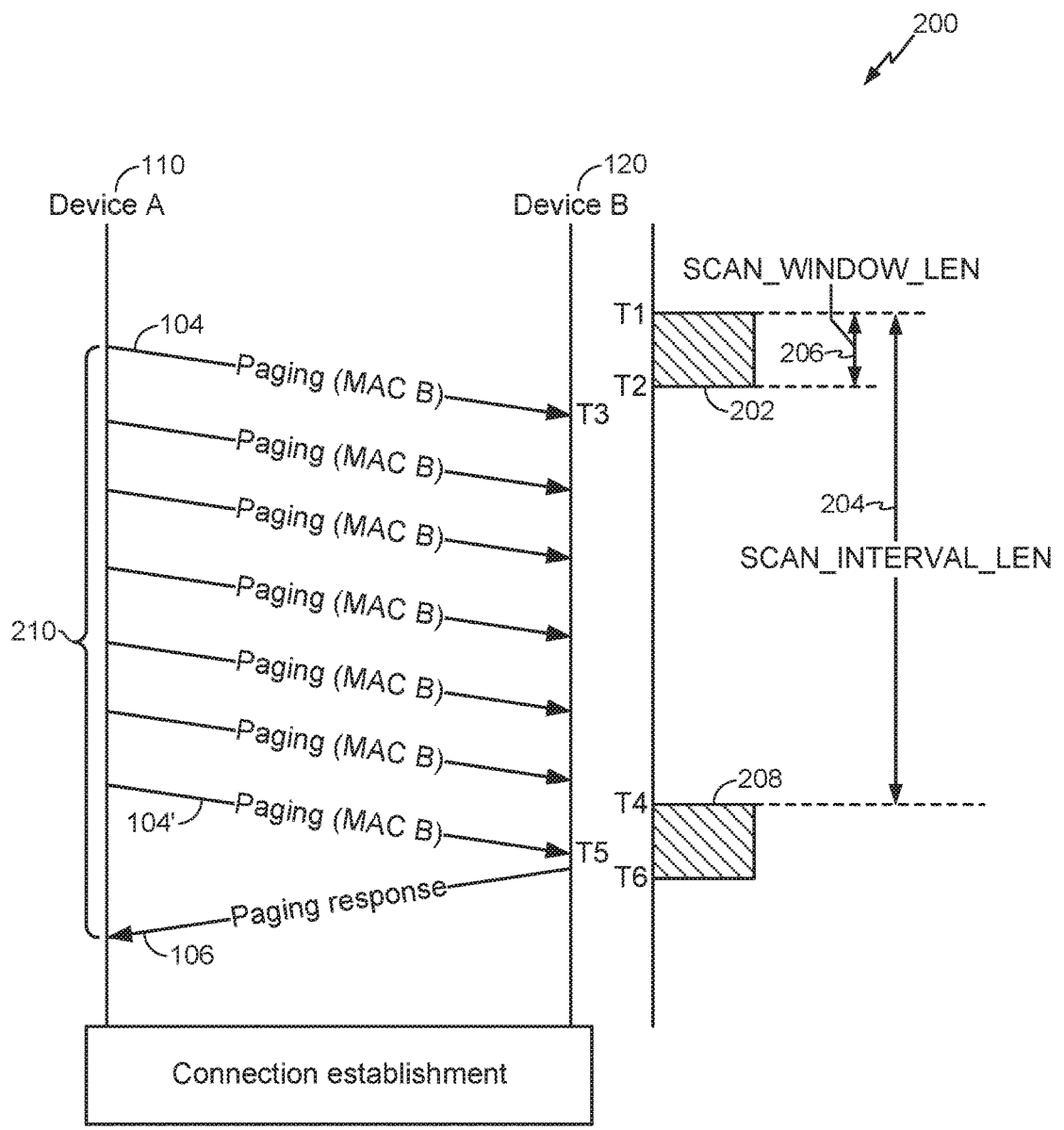
FIG. 2 illustrates an example Bluetooth paging scan procedure, according to aspects of the disclosure.

In either case, the establishment of a Bluetooth connection may involve the wireless device 120 performing a Bluetooth paging scan procedure. For example, FIG. 2 illustrates an example Bluetooth paging scan procedure 200, according to aspects of the disclosure.

The total time to establish the Bluetooth connection may be dependent on a number of factors, one of which is the duration (i.e., paging procedure duration 210) of the paging scan procedure 200. Prior to sending the paging signals 104, the wireless device 110 may have already received a MAC address, as well as other information about the wireless device 120.

In one aspect, the Bluetooth physical layer is based on a frequency hopping scheme, in which wireless device 110 uses one of several available frequencies according to a random or pseudo-random scheme to transmit the paging signals 104. The wireless device 120 is configured to periodically listen for the paging signals 104 during a window of time (i.e., scan windows 202 and 208). Two Bluetooth paging scan parameters, called the scan interval length 204 and the scan window length 206, control the frequency and the duration of the scan windows. For the Bluetooth paging scan procedure 200, the wireless device 120 may use a hopping sequence that covers only a portion of the available frequencies each scan window 202, 208.

For example, at time T1 the wireless device 120 begins scanning a plurality of frequencies during at least one scan window 202 of a scan interval 204 for a paging signal 104 transmitted by the second wireless device 110 over Bluetooth. As shown in FIG. 2, the scan window length is T2−T1. In one example, the scan window length may be determined by a default page scan configuration that sets the scan window length 206 to 10.625 milliseconds and the scan interval length 204 to 1.28 seconds.

At time T3, the first paging signal 104 is received at the wireless device 120. However, at time T3, the scan window 202 has already ended. Thus, the wireless device 120 may not detect the first paging signal 104. The wireless device 110 may thus be configured to continue transmitting paging signals 104 until a paging response 106 is received, or until a timeout occurs.

At time T4, the wireless device 120 repeats the scan interval by beginning a new scan window 208 of listening for the paging signals 104. At time T5, the wireless device 120 receives, and detects the paging signal 104'. In response thereto, the wireless device 120 transmits the paging response 106.

The Paging procedure duration 210 is shown as beginning when the wireless device 110 transmits a first paging signal 104 and ending when the wireless device 110 receives the paging response 106. The paging procedure duration 210 may be directly proportional to the scan interval length 204, but may also be indirectly proportional to power consumption. Accordingly, in order to strike a balance between paging procedure duration 210 and power consumption, an appropriate set of values, not necessarily the quickest, are chosen for the Bluetooth paging scan parameters (e.g., scan interval length).

Furthermore, the Bluetooth paging scan parameters may include an interlaced scan parameter that enables/disables interlaced page scanning by the wireless device 200. However, to further reduce power consumption, the interlaced scan parameter used for the Bluetooth paging scan procedure 200 of FIG. 2 may be set to disable interlaced page scanning. As mentioned above, each scan window 202, 208 may each only include the scanning of a portion (e.g., half) of the available Bluetooth frequencies. Thus, in some instances the paging procedure duration 210 may extend to twice the scan interval length 204 (e.g., 0<paging procedure duration<(2*scan interval length)).

Accordingly, aspects of the present disclosure include adjusting one or more of the Bluetooth paging scan parameters in the case of an NFC to Bluetooth handover. That is, in one aspect one or more of the Bluetooth paging scan parameters can be changed to a 'fast connection' parameter set (i.e., a Bluetooth paging scan parameter set used for quicker connection) after an NFC tap. Since a Bluetooth connection is imminent, the NFC controller 154 can indicate to the Bluetooth controller 156 to switch to the 'fast connection parameters set'. This way of setting the Bluetooth paging scan parameters to the 'fast connection' set based on NFC input leading up to an NFC to Bluetooth handover may reduce the paging procedure duration 210 and thus the Bluetooth connection time and therefore improve the user experience without significantly impacting the power consumption.

Figure 3:
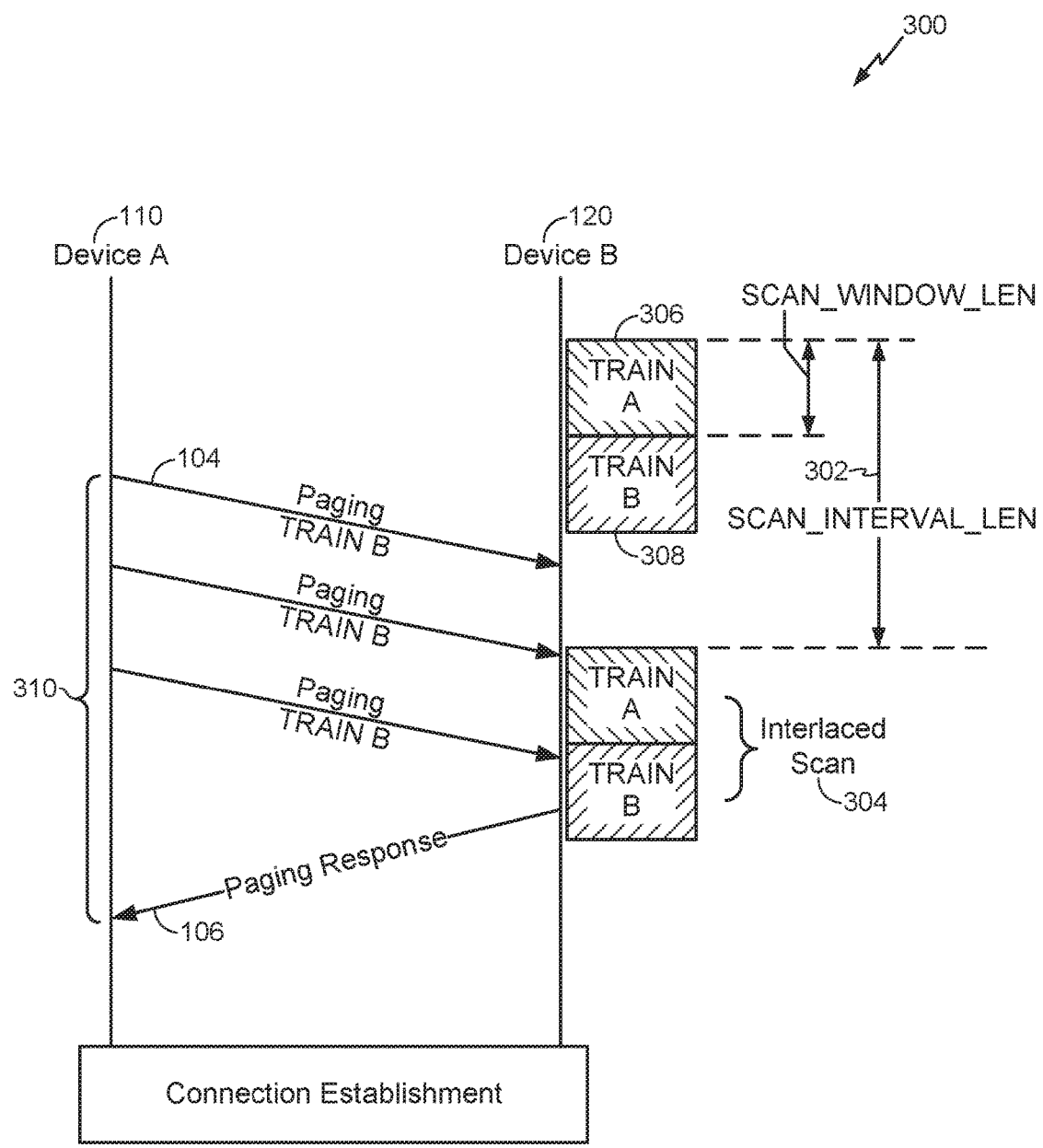
FIG. 3 illustrates another example Bluetooth paging scan procedure, according to aspects of the disclosure.

By way of example, FIG. 3 illustrates a Bluetooth paging scan procedure 300, according to aspects of the disclosure. For the Bluetooth paging scan procedure 300, one or more of the Bluetooth paging scan parameters have been adjusted, as compared to the Bluetooth paging scan parameters of the Bluetooth paging scan procedure 200 of FIG. 2. For example, the scan interval length 302 has been decreased to a lower value (e.g., 100 milliseconds). Also, the interlaced scan parameter 304 has been set to enable interlaced paging scan during the Bluetooth paging scan procedure 300. Thus, not only is the scan interval length 302 shorter, but in some instances the paging procedure duration 310 may be less than the scan interval length 302 (e.g., 0<paging procedure duration<scan interval length).

As shown in FIG. 3, the interlaced page scanning by wireless device 120 includes multiple scan windows 306 and 308 occurring during each scan interval. In one aspect, the available Bluetooth frequencies are split into two trains (i.e., TRAIN A and TRAIN B).

In one aspect, the adjustment of the Bluetooth paging scan parameters are in response to additional information coming from the NFC interaction that triggers the Bluetooth connection procedure. For example, the NFC controller 154 may generate an NFC tag read indication 108 when the wireless device 120 detects an NFC read by another device (e.g., via message 102 transmitted by wireless device 110 over link 130). The NFC read can be used as an indication of the presence of a device interested in establishing a Bluetooth connection. Thus, wireless device 120 may be configured to use this information as a trigger to adjust the Bluetooth paging scan parameters to a 'fast connection' set in order to reduce the paging procedure duration 310 for wireless device 120.

Figure 4:
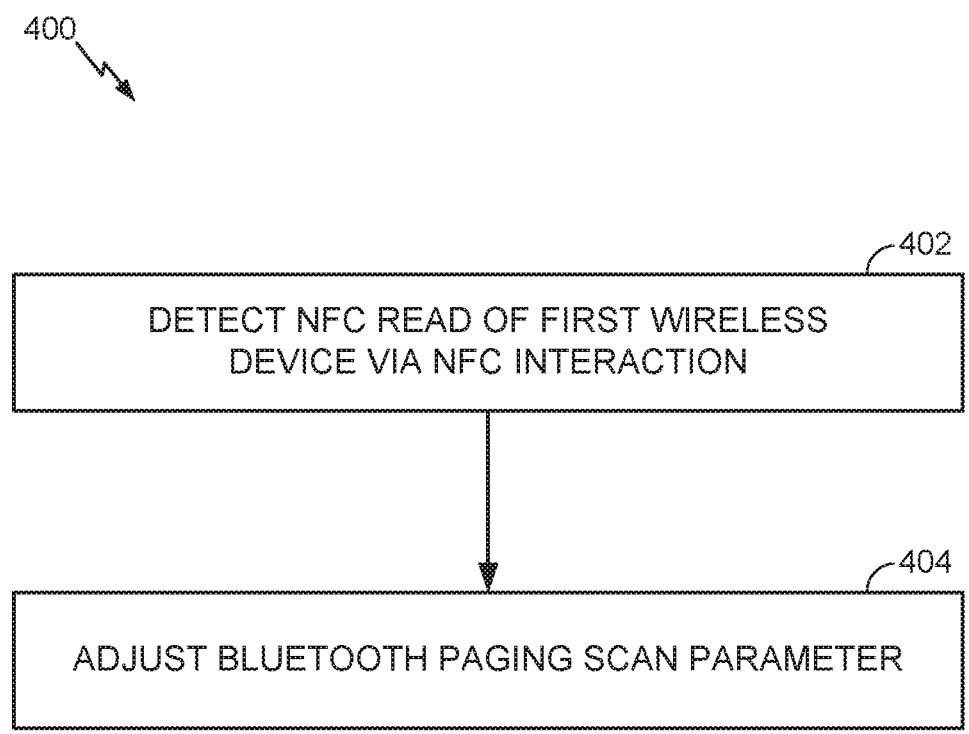
FIG. 4 illustrates an example process of wireless communication by a wireless device, according to aspects of the disclosure.

FIG. 4 illustrates an example process 400 of wireless communication by a wireless device, according to aspects of the disclosure. Process 400 is one example process performed by wireless device 120 of FIG. 1. In a process block 402, the NFC controller 154 detects an NFC read of the wireless device 120 by another wireless device (e.g., wireless device 110). In one example, the NFC read of wireless device 120 includes a read of data stored in memory component 128. In one aspect, the data stored in the memory component 128 may correspond to one or more Bluetooth capabilities of the wireless device 120. That is, the data may include an indication that the wireless device 120 is capable of performing Bluetooth communications and/or one or more parameters supporting the handover of wireless communications from NFC to Bluetooth. By way of example, the data stored in the memory component 128 corresponds to a handover select message. In one aspect, the handover select message contains configuration information that may allow the wireless device 120 to be discovered via Bluetooth.

Next, in a process block 404, the wireless device 120 adjusts at least one Bluetooth paging scan parameter (e.g., interlaced scan parameter and/or scan interval length parameter) in response to detecting the NFC read. As mentioned above, the NFC controller 154 may be configured to generate a NFC tag read indication 108, which is detected by the Bluetooth controller 156 as an indication to adjust the Bluetooth paging scan parameters. In one aspect, NFC controller 154 is configured to generate the NFC tag read indication 108 upon detecting the beginning of the NFC read (e.g., the NFC read initiated by wireless device 110). Thus, the adjustment of the at least one Bluetooth paging scan parameter may be completed prior to completion of the NFC read. For example, as mentioned above, the NFC read initiated by the wireless device 110 may include a read of data stored at the wireless device 120, where the data may correspond to a handover select message. In this example, the wireless device 120 may be configured to transmit the handover select message to the wireless device 110 in response to the NFC read. Continuing with this example, the NFC controller 154 may be configured to generate the NFC tag read indication 108 prior to completing the transmission of the handover select message, or, in some instances, may generate the NFC tag read indication 108 prior to even beginning the transmission of the handover select message. Accordingly, process block 404, of process 400, may include the Bluetooth controller 156 adjusting the at least one Bluetooth paging scan parameter prior to completing the transmission of the handover select message from the wireless device 120 to the wireless device 110.

The adjustment of the Bluetooth paging scan parameters may include decreasing the scan interval length and/or enabling interlaced page scanning by way of the interlaced scan parameter. After the Bluetooth paging scan parameters have been adjusted, the wireless device 120 may perform a handover of the wireless device 110 from NFC to Bluetooth. In one aspect, performing the handover includes performing the Bluetooth paging scan procedure 300 of FIG. 3.

As will be described in more detail below, upon completion of the handover procedure, the wireless device 120 may be configured to again adjust the Bluetooth paging scan parameters. This, in one example, this adjustment may include reverting the Bluetooth paging scan parameters to their default values (i.e., the values prior to the adjustment of process block 404) in response to completing the handover of wireless device 110 from NFC to Bluetooth. In some aspects, the communication controller (e.g., communication controller 124) of the wireless device (e.g., wireless device 120) may be configured to determine whether the NFC read of the wireless device 120 was unsuccessful. As mentioned above, the Bluetooth controller 156 may adjust the at least one Bluetooth paging scan parameter in response to detecting (e.g., the beginning) of an NFC read. Thus, if the communication controller 124 determines that the NFC read was unsuccessful, Bluetooth controller 156 may be configured to revert the Bluetooth paging scan parameters back to their default values. In one example, NFC controller 154 is configured to provide an indication (e.g., by way of a message) to Bluetooth controller 156 indicating the successful or unsuccessful transmission of the handover select message, where Bluetooth controller 156 is configured to revert the Bluetooth paging scan parameters back to their default values in response to the indication indicating that the transmission was unsuccessful.

Figure 5:
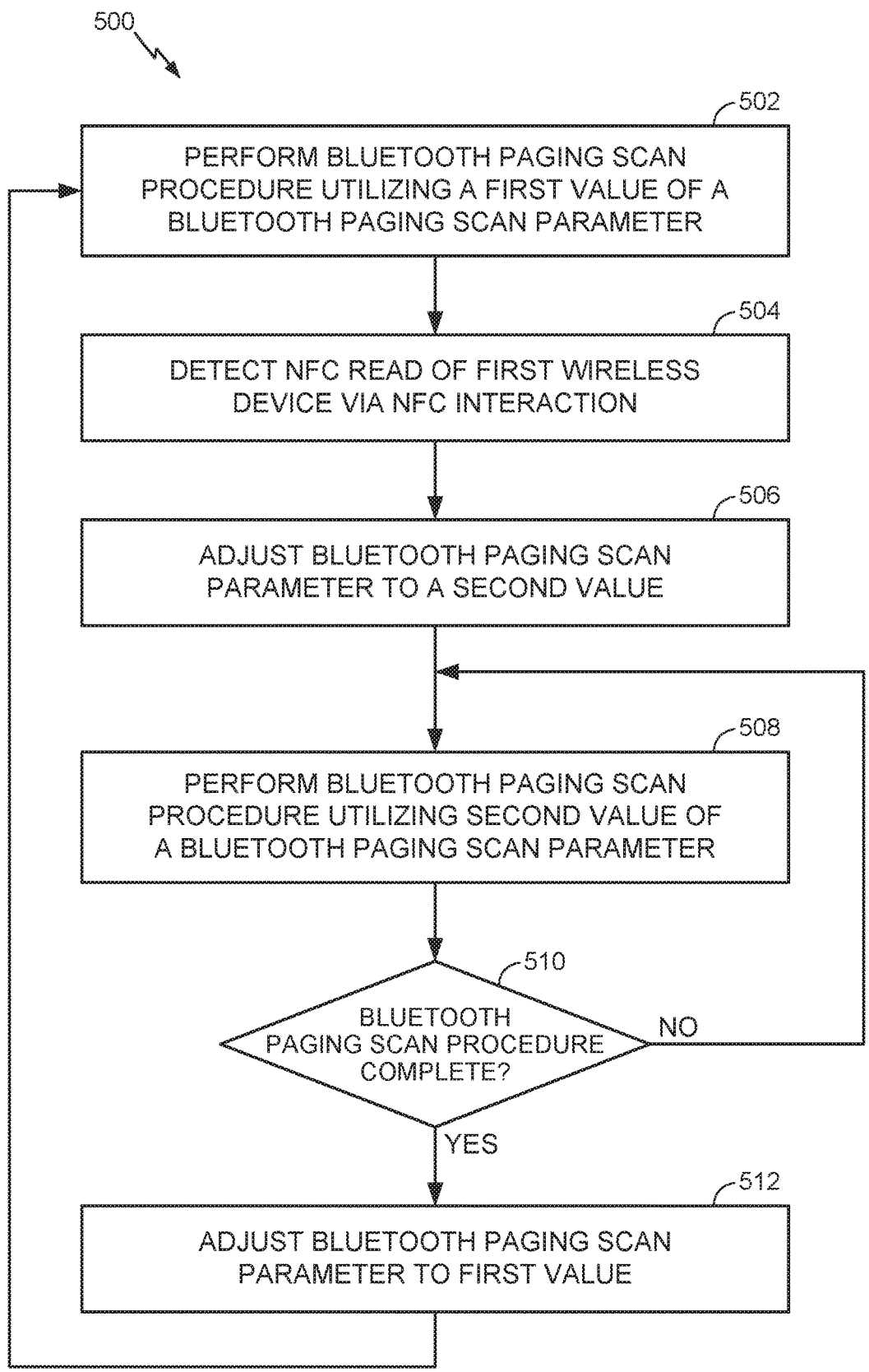
FIG. 5 illustrates another example process of wireless communication by a wireless device, according to aspects of the disclosure.

FIG. 5 illustrates another example process 500 of wireless communication by a wireless device, according to aspects of the disclosure. Process 500 is one example process performed by wireless device 120 of FIG. 1. In a process block 502, Bluetooth controller 156 may perform a Bluetooth paging scan procedure utilizing a first value of a Bluetooth paging scan parameter. By way of the example, the Bluetooth paging scan procedure performed in process block 502 may include the Bluetooth paging scan procedure 200 of FIG. 2, with the scan interval length 204 set to a default value (e.g., 1.28 seconds) and the interlaced paging parameter set to disable interlaced page scanning.

Next, in a process block 504, the NFC controller 154 detects an NFC read of the wireless device 120 by another wireless device (e.g., wireless device 110). In a process block 506, the wireless device 120 adjusts at least one Bluetooth paging scan parameter to a second value in response to detecting the NFC read. For example, the Bluetooth controller 156 may decrease the scan interval length to a second (lower) value (e.g., 100 milliseconds) and/or set the interlaced paging parameter to enable interlaced page scanning.

In process block 508, the wireless device 120, under direction of Bluetooth controller 156, performs a Bluetooth paging scan procedure utilizing the second value of the Bluetooth paging scan parameter (e.g., the lower scan interval length and/or the enabled interlaced page scanning parameter). By way of the example, the Bluetooth paging scan procedure of process block 508 may include performing the Bluetooth paging scan procedure 300 of FIG. 3.

Next, in decision block 510, the wireless device 120 determines whether the Bluetooth paging scan procedure of process block 506 is complete. If not, process 500 returns to process block 508 to continue the Bluetooth paging scan procedure utilizing the second value of the Bluetooth paging scan parameters. If, in decision block 510, it is determined that the Bluetooth paging scan procedure is complete, process 500 may proceed to process block 512 where the Bluetooth controller 156 may again adjust the Bluetooth paging scan parameters. The adjustment of the Bluetooth paging scan parameters in process block 512 may include adjusting them back to the first value (e.g., increasing the interval scan length and/or disabling interlaced page scanning).

In one aspect, determining that the Bluetooth paging scan procedure is complete may include setting a timer to a pre-defined time, where after expiration of the timer, completion of the Bluetooth paging scan procedure is assumed.

Accordingly, aspects of the present disclosure may provide for the reduction in an average duration of paging procedure. Also, it is assumed that the paging phase duration for wireless device 110 that wants to establish a Bluetooth connection with wireless device 120 is a uniformly distributed random variable varying in the intervals defined above. Thus, the variance of the paging procedure is reduced, as the possible duration interval is reduced. Both these points will result in a better user experience.

Figure 6:
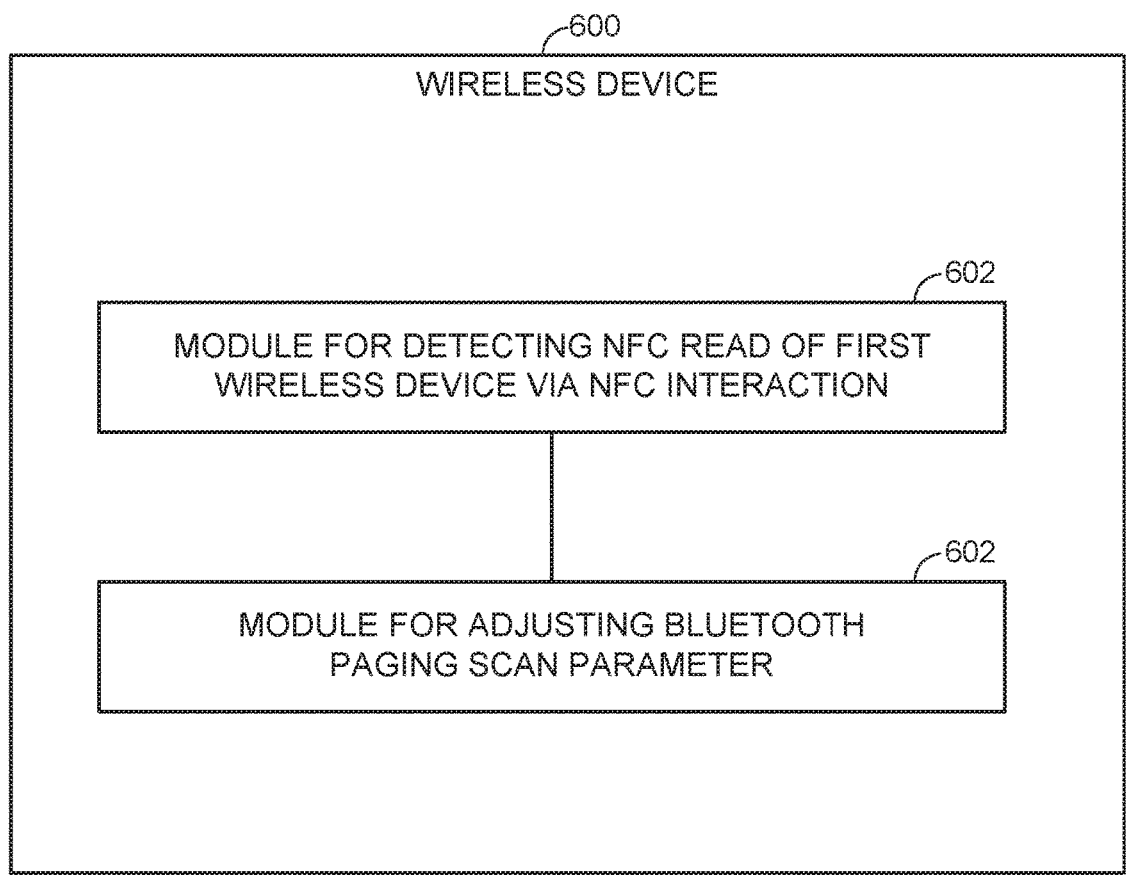
FIG. 6 is a simplified block diagram of several sample aspects of wireless devices configured to support wireless communication as taught herein.

FIG. 6 is a simplified block diagram of several sample aspects of a wireless device 600 configured to support wireless communication as taught herein. Wireless device 600 is one possible implementation of wireless device 120 of FIG. 1. FIG. 6 illustrates wireless device 600 represented as a series of interrelated functional modules. A module 602 for detecting an NFC read of the first wireless device 602 via an NFC connection may correspond at least in some aspects to, for example, first RAT transceiver 150 and/or NFC controller 154 of FIG. 1, as discussed herein. A module 604 for adjusting at least one Bluetooth paging scan parameter in response to detecting the NFC read may correspond at least in some aspects to, for example, second RAT transceiver 152 and/or Bluetooth controller 156 of FIG. 1.

The functionality of the modules of FIG. 6 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 6, as well as other components and functions described herein, may be implemented using any suitable means. Such means also may be implemented, at least in part, using corresponding structure as taught herein. For example, the components described above in conjunction with the "module for" components of FIG. 6 also may correspond to similarly designated "means for" functionality. Thus, in some aspects one or more of such means may be implemented using one or more of processor components, integrated circuits, or other suitable structure as taught herein.

Further, those of skill in the art will appreciate that the various illustrative logical blocks, modules, circuits, and algorithm steps described in connection with the aspects disclosed herein may be implemented as electronic hardware or a combination of computer software and electronic hardware. To clearly illustrate this interchangeability of hardware and hardware-software combinations, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a non-transitory computer-readable media embodying a method for wireless communications, such as the processes for NFC to Bluetooth handover, as discussed herein. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of wireless communication by a first wireless device, the method comprising:
   detecting, by the first wireless device, a near field communication (NFC) read of the first wireless device by a second wireless device via an NFC interaction between the first wireless device and the second wireless device; and
   adjusting at least one Bluetooth paging scan parameter of the first wireless device prior to completion of the NFC read by the second wireless device.

2. The method of claim 1, wherein the NFC read comprises a read of data stored at the first wireless device corresponding to one or more Bluetooth capabilities of the first wireless device.

3. The method of claim 2, wherein the data corresponds to a handover select message, wherein adjusting the at least one Bluetooth paging scan parameter comprises adjusting the at least one Bluetooth paging scan parameter prior to completing a transmission of the handover select message from the first wireless device to the second wireless device.

4. The method of claim 1, wherein the at least one Bluetooth paging scan parameter is a scan interval length parameter corresponding to a scan interval length of a Bluetooth paging scan procedure performed by the first wireless device.

5. The method of claim 4, wherein adjusting the at least one Bluetooth paging scan parameter comprises decreasing the scan interval length parameter to decrease the scan interval length of the Bluetooth paging scan procedure.

6. The method of claim 1, further comprising performing a handover of the second wireless device from NFC to Bluetooth between the first wireless device and the second wireless device after adjusting the at least one Bluetooth paging scan parameter.

7. The method of claim 6, wherein performing the handover comprises performing a Bluetooth paging scan procedure utilizing the adjusted at least one Bluetooth paging scan parameter.

8. The method of claim 7, wherein the Bluetooth paging scan procedure comprises:
   scanning a plurality of frequencies during at least one scan window of a scan interval for a paging signal transmitted by the second wireless device over Bluetooth;
   repeating the scan interval at a scan interval length; and
   transmitting a paging response message over Bluetooth in response to detecting the paging signal during the at least one scan window.

9. The method of claim 6, further comprising adjusting the at least one Bluetooth paging scan parameter in response to completing the handover of the second wireless device from NFC to Bluetooth.

10. The method of claim 9, wherein the at least one Bluetooth paging scan parameter is a scan interval length parameter corresponding to an scan interval length of the Bluetooth paging scan procedure, and wherein adjusting the at least one Bluetooth paging scan parameter in response to completing the handover of the second wireless device comprises increasing the scan interval length parameter to increase the scan interval length of the Bluetooth paging scan procedure.

11. The method of claim 1, further comprising:
   performing, by the first wireless device, a Bluetooth paging scan procedure utilizing a first value of the at least one Bluetooth paging scan parameter, wherein adjusting the at least one Bluetooth paging scan parameter comprises adjusting the at least one Bluetooth paging scan parameter to a second value in response to detecting the NFC read; and then
   performing, by the first wireless device, the Bluetooth paging scan procedure utilizing the second value of the at least one Bluetooth paging scan parameter.

12. The method of claim 11, further comprising:
   determining whether the NFC read of the first wireless device by the second wireless device is unsuccessful;
   adjusting the at least one Bluetooth paging scan parameter to the first value in response to determining that the NFC read of the first wireless device by the second wireless device was unsuccessful; and then
   performing the Bluetooth paging scan procedure utilizing the first value of the at least one Bluetooth paging scan parameter.

13. A wireless device, comprising:
   a near field communication (NFC) transceiver;
   a Bluetooth transceiver;
   memory adapted to store program code; and
   a processor coupled to the memory to access and execute instructions included in the program code to direct the wireless device to:
      detect a near field communication (NFC) read of the wireless device by another wireless device via an NFC interaction between the wireless device and the other wireless device; and
      adjust at least one Bluetooth paging scan parameter of the wireless device prior to completion of the NFC read by the other wireless device.

14. The wireless device of claim 13, wherein the NFC read comprises a read of data stored at the wireless device corresponding to one or more Bluetooth capabilities of the wireless device.

15. The wireless device of claim 14, wherein the data corresponds to a handover select message, wherein the instructions to adjust the at least one Bluetooth paging scan parameter comprises instructions to adjust the at least one Bluetooth paging scan parameter prior to completing a transmission of the handover select message from the wireless device to the other wireless device.

16. The wireless device of claim 13, wherein the program code further comprises instructions to direct the wireless device to perform a Bluetooth paging scan procedure, and wherein the at least one Bluetooth paging scan parameter is a scan interval length parameter corresponding to a scan interval length of the Bluetooth paging scan procedure.

17. The wireless device of claim 16, wherein the instructions to adjust the at least one Bluetooth paging scan parameter comprises instructions to decrease the scan interval length parameter to decrease the scan interval length of the Bluetooth paging scan procedure.

18. The wireless device of claim 13, wherein the program code further comprises instructions to perform a handover of the other wireless device from NFC to Bluetooth between the wireless device and the other wireless device after adjusting the at least one Bluetooth paging scan parameter.

19. The wireless device of claim 18, wherein the instructions to perform the handover comprises instructions to perform a Bluetooth paging scan procedure utilizing the adjusted at least one Bluetooth paging scan parameter.

20. The wireless device of claim 19, wherein the instructions to perform the Bluetooth paging scan procedure comprises instructions to direct the wireless device to:
  scan a plurality of frequencies during at least one scan window of a scan interval for a paging signal transmitted by the other wireless device over Bluetooth;
  repeat the scan interval at a scan interval length; and
  transmit a paging response message over Bluetooth in response to detecting the paging signal during the at least one scan window.

21. The wireless device of claim 13, wherein the program code further comprises instructions to adjust the at least one Bluetooth paging scan parameter in response to completing a handover of the other wireless device from NFC to Bluetooth.

22. The wireless device of claim 21, wherein the at least one Bluetooth paging scan parameter is a scan interval length parameter corresponding to an scan interval length of the Bluetooth paging scan procedure, and wherein the instructions to adjust the at least one Bluetooth paging scan parameter in response to completing the handover of the other wireless device comprises instructions to increase the scan interval length parameter to increase the scan interval length of the Bluetooth paging scan procedure.

23. The wireless device of claim 13, wherein the program code further comprises instructions to direct the wireless device to:
  perform a Bluetooth paging scan procedure utilizing a first value of the at least one Bluetooth paging scan parameter, wherein the instructions to adjust the at least one Bluetooth paging scan parameter comprises instructions to adjust the at least one Bluetooth paging scan parameter to a second value in response to detecting the NFC read; and then
  perform the Bluetooth paging scan procedure utilizing the second value of the at least one Bluetooth paging scan parameter.

24. The wireless device of claim 23, wherein the program code further comprises instructions to direct the wireless device to:
  determine whether the NFC read of the wireless device by the other wireless device is unsuccessful;
  adjust the at least one Bluetooth paging scan parameter to the first value in response to determining that the NFC read of the wireless device by the other wireless device was unsuccessful; and then
  perform the Bluetooth paging scan procedure utilizing the first value of the at least one Bluetooth paging scan parameter.

25. A non-transitory computer-readable medium including program code stored thereon for performing wireless communications by a wireless device, the program code comprising instructions to direct the wireless device to:
  detect a near field communication (NFC) read of the wireless device by another wireless device via an NFC interaction between the wireless device and the other wireless device; and
  adjust at least one Bluetooth paging scan parameter of the wireless device prior to completion of the NFC read by the other wireless device.

26. The non-transitory computer-readable medium of claim 25, wherein the NFC read comprises a read of data stored at the wireless device corresponding to one or more Bluetooth capabilities of the wireless device.

27. The non-transitory computer-readable medium of claim 26, wherein the data corresponds to a handover select message, wherein the instructions to adjust the at least one Bluetooth paging scan parameter comprise instructions to adjust the at least one Bluetooth paging scan parameter prior to completing a transmission of the handover select message from the wireless device to the other wireless device.

28. The non-transitory computer-readable medium of claim 25, wherein the program code further comprises instructions to direct the wireless device to perform a Bluetooth paging scan procedure, and wherein the at least one Bluetooth paging scan parameter is a scan interval length parameter corresponding to a scan interval length of the Bluetooth paging scan procedure.

29. The non-transitory computer-readable medium of claim 25, wherein the program code further comprises instructions to direct the wireless device to:
  perform a Bluetooth paging scan procedure utilizing a first value of the at least one Bluetooth paging scan parameter, wherein the instructions to adjust the at least one Bluetooth paging scan parameter comprises instructions to adjust the at least one Bluetooth paging scan parameter to a second value in response to detecting the NFC read; and then
  perform the Bluetooth paging scan procedure utilizing the second value of the at least one Bluetooth paging scan parameter.

30. The non-transitory computer-readable medium of claim 29, wherein the program code further comprises instructions to direct the wireless device to:
  determine whether the NFC read of the wireless device by the other wireless device is unsuccessful;
  adjust the at least one Bluetooth paging scan parameter to the first value in response to determining that the NFC read of the wireless device by the other wireless device was unsuccessful; and then
  perform the Bluetooth paging scan procedure utilizing the first value of the at least one Bluetooth paging scan parameter.

31. A wireless device, comprising:
  a near field communication (NFC) transceiver;
  a Bluetooth transceiver;
  means for detecting, by the wireless device, a near field communication (NFC) read of the wireless device by another wireless device via an NFC interaction between the wireless device and the other wireless device; and
  means for adjusting at least one Bluetooth paging scan parameter of the wireless device prior to completion of the NFC read by the other wireless device.

32. The wireless device of claim 31, wherein the NFC read comprises a read of data stored at the wireless device corresponding to one or more Bluetooth capabilities of the wireless device.

33. The wireless device of claim 32, wherein the data corresponds to a handover select message, wherein the means for adjusting the at least one Bluetooth paging scan parameter comprises means for adjusting the at least one Bluetooth paging scan parameter prior to completing a transmission of the handover select message from the wireless device to the other wireless device.

34. The wireless device of claim 31, further comprising means for performing a Bluetooth paging scan procedure, wherein the at least one Bluetooth paging scan parameter is a scan interval length parameter corresponding to a scan interval length of the Bluetooth paging scan procedure.

* * * * *